United States Patent
Mieth et al.

(10) Patent No.: US 10,830,596 B2
(45) Date of Patent: Nov. 10, 2020

(54) METHODS AND SYSTEMS FOR GENERATING EXPECTED SPEEDS OF TRAVEL

(71) Applicant: TomTom Traffic B.V., Amsterdam (NL)

(72) Inventors: Peter Mieth, Amsterdam (NL); Gregor Wuensch, Amsterdam (NL); Jan-Philipp Kappmeier, Amsterdam (NL); Rene Beier, Amsterdam (NL)

(73) Assignee: TOMTOM TRAFFIC, B.V., Amsterdam (NL)

( * ) Notice: Subject to any disclaimer, the term of this patent is extended or adjusted under 35 U.S.C. 154(b) by 183 days.

(21) Appl. No.: 16/070,642

(22) PCT Filed: Jan. 25, 2017

(86) PCT No.: PCT/EP2017/051488
§ 371 (c)(1),
(2) Date: Jul. 17, 2018

(87) PCT Pub. No.: WO2017/129586
PCT Pub. Date: Aug. 3, 2017

(65) Prior Publication Data
US 2020/0064139 A1 Feb. 27, 2020

(30) Foreign Application Priority Data
Jan. 25, 2016 (GB) .................................. 1601296.5

(51) Int. Cl.
*G01C 21/32* (2006.01)
*G01C 21/34* (2006.01)
(Continued)

(52) U.S. Cl.
CPC ......... *G01C 21/32* (2013.01); *G01C 21/3492* (2013.01); *G08G 1/0129* (2013.01); *G08G 1/052* (2013.01)

(58) Field of Classification Search
CPC ........................ G01C 21/3492; G01C 21/3453
See application file for complete search history.

(56) References Cited

U.S. PATENT DOCUMENTS

| 2006/0161334 A1 | 7/2006 | Teramae |
| 2010/0250127 A1* | 9/2010 | Hilbrandie ............. G01C 21/32 701/533 |

(Continued)

FOREIGN PATENT DOCUMENTS

| CN | 103632537 | 3/2014 |
| JP | 2009134529 | 6/2009 |

(Continued)

OTHER PUBLICATIONS

United Kingdom Search Report, application No. GB1601296.5, dated Jun. 6, 2016.

(Continued)

*Primary Examiner* — Kenneth J Malkowski

(57) ABSTRACT

A method and system for generating an expected speed of travel along one or more navigable elements of a navigable network within a geographic area, each navigable element being represented by a segment of an electronic map. The method comprising obtaining positional data relating to the movement of a plurality of devices along a navigable element represented by a segment of the electronic map. The positional data is used to determine a first mean speed of travel and a second mean speed of travel for the segment, and an expected speed of travel is determined for the segment as a value between the first mean speed of travel and the second mean speed of travel determined based on a congestion parameter for the segment. Data indicative of the determined expected speed of travel is then associated with the segment in the electronic map.

13 Claims, 9 Drawing Sheets

(51) Int. Cl.
    *G08G 1/01*       (2006.01)
    *G08G 1/052*     (2006.01)

(56) References Cited

U.S. PATENT DOCUMENTS

| | | |
|---|---|---|
| 2014/0005916 A1 | 1/2014 | Shen et al. |
| 2015/0211871 A1 | 7/2015 | Jeong et al. |

FOREIGN PATENT DOCUMENTS

| | | |
|---|---|---|
| KR | 20110116779 | 10/2011 |
| WO | 2009130257 | 10/2009 |
| WO | 2012104392 | 8/2012 |
| WO | 2014001549 | 1/2014 |

OTHER PUBLICATIONS

International Search Report, application No. PCT/EP2017/051488, dated Jun. 1, 2017.
H. van Lint et al., Traffic monitoring for coordinated traffic management—Experiences from the field trial integrated traffic management in Amsterdam, 17th International IEEE Conference on Intelligent Transportation Systems (ITSC), Oct. 2014.
Y. Yufei et al., Automatic speed-bias correction with flow-density relationships, International Conference on Networking, Sensing and Control (ICNSC), Apr. 2010.

\* cited by examiner

METHODS AND SYSTEMS FOR GENERATING EXPECTED SPEEDS OF TRAVEL

CROSS-REFERENCE TO RELATED APPLICATIONS

The present application is a National Stage of International Application No. PCT/EP2017/051488, filed on Jan. 25, 2017, and designating the United States, which claims benefit to United Kingdom Patent Application 1601296.5 filed on Jan. 25, 2016. The entire content of these applications is incorporated herein by reference.

FIELD OF THE INVENTION

This invention relates to a method of generating speed related data in respect of one or more segments in an area covered by an electronic map as well as a system, a server and a navigation device on which part or all of the method may be implemented. In particular, the invention relates to generating one or more expected speeds of travel for the one or more segments. The generated speed related segment data may in particular, but not exclusively, be used in journey time prediction and route generation for an electronic navigation device, such as a portable navigation device (PND).

BACKGROUND OF THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Navigation devices also typically have access to a digital map representative of a navigable network on which the vehicle is travelling. The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for searching for a "best" or "optimum" route between the start and destination address locations from the map data. A "best" or "optimum" route is determined on the basis of predetermined criteria and need not necessarily be the fastest or shortest route. The searching for a route along which to guide the driver can be very sophisticated, and the search may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: (i) a user deviates from the previously calculated route during navigation (either by accident or intentionally); (ii) real-time traffic conditions dictate that an alternative route would be more expedient and the device is suitably enabled to recognize such conditions automatically; or (iii) a user actively causes the device to perform route re-calculation for any reason.

Although route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

Typically, each segment of the digital (or electronic) map has associated therewith an expected speed or transit time for which gives an indication of the speed at which a vehicle can expect to travel along the road represented by the segment at a particular time. The expected speed or transit time will typically vary in time, and so in most instances each segment will have an associated "speed profile", from which can be derived an expected speed or traversal time for a set of predetermined time periods, e.g. every 30 minutes of a day. The speed profile is typically based on average speeds generated from historical position ("probe") data by the party that produced the map data. An exemplary method of generating such speed profiles is described in WO 2009/053411 A1; the entire content of which is incorporated herein by reference.

The speed profiles for the segments are used to predict journey times and are used by route planning algorithms on PNDs on which the map is processed. For example, a user is often presented with an option on their PND to have it generate the fastest route between the current location of the device and a destination. The accuracy of such route planning thus depends on the accuracy of the speed profiles. The route calculated by the PND may well not be the fastest route if the speed profiles are inaccurate. Inaccuracies in the speed profiles of road segments can also lead to inaccurate predicted journey times and inaccurate estimated times of arrival (ETAs).

The Applicant has identified that there remains scope for improvement in methods of generating expected speeds of travel across segments.

SUMMARY OF THE INVENTION

According to a first aspect of the invention there is provided a method for generating an expected speed of travel along one or more navigable elements of a navigable network within a geographic area, each navigable element being represented by a segment of an electronic map, the electronic map comprising a plurality of segments representative of the navigable network, wherein each of the segments is associated with a congestion parameter indicating the severity of congestion on the navigable element represented by the respective segment, said method comprising:

obtaining positional data relating to the movement of a plurality of devices along a navigable element represented by a segment of the electronic map;

determining, using the positional data, a first mean speed of travel and a second mean speed of travel for the segment;

determining an expected speed of travel for the segment, the expected speed of travel being a value between the first mean speed of travel and the second mean speed of travel determined based on the congestion parameter for the segment; and associating data indicative of the determined expected speed of travel with the segment in the electronic map.

This method allows a determination of the expected speed of travel across a segment to be made in an informed manner based on a congestion parameter for the segment. In particular, the expected speed of travel is determined, based on the congestion parameter, as being a value between a first mean speed of travel, such as an harmonic mean, and a second mean speed of travel, such as an arithmetic mean. As will be discussed in more detail below, the harmonic mean gives more weight to lower speeds, therefore meaning the determined speed is lower or equal compared to the arithmetic mean, but is also more sensitive to low speed outliers.

The present invention also extends to a system for carrying out a method in accordance with any of the aspects or embodiments of the invention herein described.

Thus, according to a further aspect of the invention there is provided a system for generating an expected speed of travel along one or more navigable elements of a navigable network within a geographic area, each navigable element being represented by a segment of an electronic map, the electronic map comprising a plurality of segments representative of the navigable network, wherein each of the segments is associated with a congestion parameter indicating the severity of congestion on the navigable element represented by the respective segment, said system comprising:

means for obtaining positional data relating to the movement of a plurality of devices along a navigable element represented by a segment of the electronic map;

means for determining, using the positional data, a first mean speed of travel and a second mean speed of travel for the segment;

means for determining an expected speed of travel for the segment, the expected speed of travel being a value between the first mean speed of travel and the second mean speed of travel determined based on the congestion parameter for the segment; and means for associating data indicative of the determined expected speed of travel with the segment in the electronic map.

This further aspect of the present invention can and preferably does include any one or more or all of the preferred and optional features of the invention described herein in respect of any other aspects or embodiments of the invention, as appropriate. For example, even if not explicitly stated, the system may comprise means for carrying out any step or steps described in relation to the method herein in any of its aspects or embodiments, and vice versa. The means for carrying out any of the steps described in relation to the method or system may comprise one or more processors and/or processing circuitry. The present invention is therefore preferably a computer implemented invention, and any of the steps described in relation to any of the aspects or embodiments of the invention may be carried out under the control of a set of one or more processors and/or processing circuitry.

The system and/or one or more processors and/or processing circuitry may be at least part of a server or a navigation device. The steps of the method of the present invention in any of its aspects or embodiments may therefore be carried out in part by a server and/or in part by a navigation device. For example the steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Accordingly the invention can encompass a server arranged to generate expected speeds of travel for association with one or more segments of the electronic map.

The navigable network may comprise a road network, wherein each navigable element represents a road or a portion of a road. For example, a navigable element can represent a road between two adjacent intersections of the road network, or a navigable element may represent a portion of a road between two adjacent intersections of the road network. As will be appreciated, however, the navigable network is not limited to a road network, and may comprise, for example, a network of foot paths, cycle paths, rivers, etc. It should be noted that the term "segment" as used herein takes its usual meaning in the art. A segment of an electronic map is a navigable link that connects two points or nodes. While embodiments of the present invention are described with particular reference to road segments, it should be realised that the invention may also be applicable to other navigable segments, such as segments of a path, river, canal, cycle path, tow path, railway line, or the like. Thus, any reference to a "road segment" may be replaced by a reference to a "navigable segment" or any specific type or types of such segments.

The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

In the present invention, at least some, although not necessarily all, of the segments of the electronic map have a congestion parameter indicating the severity of congestion on the navigable element represented by the segment. As will be discussed in more detail below, a segment may have a plurality of congestion parameter values associated therewith, each congestion parameter value being indicative of a different period of time. It should be noted that references to "congestion parameter" or "congestion parameter value" herein should be understood to refer to data indicative of these factors unless the context demands otherwise. The data may be in any way indicative of the severity of congestion, and may be directly or indirectly indicative thereof. Thus any reference to congestion parameter may be replaced by a reference to data indicative thereof, i.e. congestion severity data. It should also be noted that the phrase "associated therewith" in relation to one or more segments should not be interpreted to require any particular restriction on data storage locations. The phrase only requires that the features are identifiably related to a segment and shorter time period. Therefore association may for example be achieved by means of a reference to a side file, potentially located in a remote server.

The present invention involves obtaining positional data relating to the movement of a plurality of devices along one or more navigable elements of a navigable network with respect to time. The step of obtaining the positional data relating to the movement of devices along a navigable element is carried out by reference to the electronic map data indicative of the segment representing the navigable element of the network. The method may involve a step of matching positional data relating to the movement of devices in a geographic region including the network of navigable elements to each segment of the electronic map that is being considered in accordance with the invention.

In some arrangements the step of obtaining the positional data may comprise accessing the data, i.e. the data being previously received and stored. The positional data is preferably historical data. In this context the word historic should be considered to indicate data that is not directly reflective of conditions on the segment at the present time or in the recent past (perhaps within roughly the last five, ten, fifteen or thirty minutes). Historic data may for example relate to events occurring days, weeks or even years in the past.

In some arrangements the method may comprise receiving the positional data from the devices. In embodiments in which the step of obtaining the data involves receiving the data from the devices, the method may further comprise storing the received positional data before proceeding to carry out the other steps of the present invention. The step of receiving the positional data need not take place at the same time or place as the other step or steps of the method.

As discussed above, the positional data may be collected from a plurality of devices, and relates to the movement of those devices with respect to time. Thus, the devices are mobile devices. The positional data is preferably associated with temporal data, e.g. a timestamp. The positional data may be used to provide a positional "trace" of the path taken by the device. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indicating the position of the receiver at a particular point in time, and which preferably receives updated position information at regular intervals. Such devices may include navigation devices, mobile telecommunications devices with positioning capability, position sensors, etc. Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus.

The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein.

Of course, the positional data may be obtained from a combination of different devices, or a single type of device. However, the present invention is not limited to the use of positional data obtained from a particular type of device, or devices associated with a particular form of transport, e.g. vehicles, and probe data from devices associated with multiple forms of transport may equally be taken into account. Typically, any probe data indicative of the movement of a device with respect to time along a navigable element may be used.

In the present invention, a first mean speed of travel and a second, different, mean speed of travel is determined for a segment using the positional data for the segment. As will be appreciated, there are a number of possible methods of determining a means speed for a segment. For example, a mean speed value could be determined as an arithmetic mean, i.e. which is the sum of a set of n numbers divided by n. Another mean speed value could be determined as a geometric mean, i.e. which is the nth root of the product of a set of n numbers. Yet another means speed value could be determined as a harmonic mean, i.e. the reciprocal of the arithmetic mean of the reciprocals of a set of n numbers. The arithmetic mean for a set of n numbers is equal to or more than the geometric mean for the set, which in turn is equal to or more than the harmonic mean. It will be understood that other mean values could also be used in the present invention.

As discussed above, the positional data for a segment preferably comprises a sequence of time stamped positions indicative of the movements of a plurality of different devices. The sequence of positions for a single device can be used to determine an average speed at which that device traverses the navigable element. A mean speed of travel for a segment is therefore preferably determined by applying an appropriate calculation technique to the average traversal speeds determined from a plurality of devices.

In a preferred embodiment of the invention, the first mean speed of travel is the arithmetic mean and the second mean speed of travel is the harmonic mean. The harmonic mean gives more weight to lower speeds, therefore meaning the determined speed is lower or equal compared to the arithmetic mean, but is also more sensitive to low speed outliers. It will be understood, however, that any combination of two methods of determining mean speeds of travel can be used in the present invention.

The Applicant has identified that there is a correlation between the method of determining a mean speed of travel for a segment and the level of congestion on the segment. In particular, it has been found if an expected speed of travel is determined based on the use of only a single type of mean, then the expected speed will tend to be accurate for time periods in which there is a lower likelihood of a jam or in which there is a high likelihood of a jam, but not both. Accordingly, in the present invention, an expected speed of travel for a segment is determined as a value between a first mean speed of travel and a second mean speed of travel based on the congestion parameter for the segment.

As will be appreciated, for many navigable elements, the level of congestion tends to fluctuate throughout the day, and indeed also throughout the week, month and year. Thus, in embodiments, of the invention, a plurality of congestion parameter values are associated with a segment, each congestion parameter value being in respect of a different time period, e.g. between 10 and 30 minutes. The time period is preferably a recurring time period, e.g. a time period that recurs on a weekly basis, such as between 9h00 and 9h45 on a Monday. In such embodiments, first and second mean speeds of travel is determined for each time period, and an expected speed of travel is determined using the first and second mean speeds and the congestion parameter value for the respective time period.

The congestion parameter is a measure reflecting the typical traffic situation on the element represented by the respective segment. The congestion parameter is thus a historic measure representative of the expected severity of congestion on a navigable element based on the analysis of historic data. In preferred embodiments, the higher the congestion parameter value the more severe the expected level of congestion on the navigable element represented by the segment Although, it will be appreciated, that the congestion parameter value could be defined such that the lower the congestion parameter value the more severe the expected level of congestion on the navigable element represented by the segment.

In preferred embodiments, the term "congestion" is used to indicate a condition on a navigable element that prevents traffic from traversing the element at the free-flow speed. A high level of congestion would be a traffic jam, wherein traffic is regularly stops and starts, while lower levels of congestion simply reflect that an event, such as a high volume of vehicles, road works, etc, are causing vehicles to travel at a slower speed than free-flow, but it is not yet stop-start traffic. Accordingly, the congestion parameter is preferably determined using a free-flow speed on an element, and is preferably a measure based on the proportion of vehicles within a set travelling slower than the free-flow speed (optionally during the relevant recurring time period) and the relative difference, for each vehicle within the set, between the measured speed and the free-flow speed. Thus, in embodiments, at least some, and probably each, of the segments of the electronic map are associated with: (i) a congestion parameter indicating the severity of congestion on the navigable element represented by the segment, and preferably a congestion parameter for each of a plurality of (recurring) time periods; and (ii) a free-flow speed of traffic on the navigable element represented by the segment. As discussed in more detail below, the method of the present invention can further include calculating the one or more congestion parameter values for a segment and/or calculating the free-flow speed for a segment. The free-flow speed is preferably determined using positional data, e.g. by determining a mean speed, such as an arithmetic mean speed, for traversing the element represented by the segment for each of a plurality of time periods, and setting the free-flow speed as the maximum determined mean speed. For example, the free-flow will typically be a determined mean speed of traffic on the element during night-time hours.

In other embodiments, the congestion parameter can be indicative of, or based on, a jam probability indicating the likelihood of a jam on the navigable element represented by the respective segment. In embodiments, the method may further comprise calculating the jam probability for each of the one or more segments, and preferably for each of a plurality of time periods, for example from the positional data. In a preferred embodiment, a jam probability for a particular segment and time period may be determined substantially according to the method described in WO 2012/104392 A1; the entire content of which is incorporated herein by reference. For example, the jam probability for a particular segment and time period may be generated according to positional data for the segment and time period and from a jam condition for the segment, wherein the jam condition indicates whether the segment is jammed or not.

The method may accordingly comprise defining a jam condition for each segment, such that when the jam condition is satisfied the segment is classified as jammed and otherwise as not jammed, calculating a jam probability for the segment and shorter time period according to the positional data and the jam condition, and associating the jam probability with the segment in the electronic map. The jam condition may be based on a jam threshold speed. The jam threshold speed may indicate an average speed of travel across that segment below which the segment is considered jammed. In other words, the jam threshold speed is selected such that an average speed of travel across the segment below the jam threshold speed can be classified as jammed, whereas an average speed of travel across the segment above the jam threshold speed can be considered not jammed. In some embodiments the jam threshold speed is defined according to a selected percentage of the free-flow speed for the segment. In alternative embodiments however the jam threshold speed may be alternatively defined, e.g. a predefined value corresponding to the road type or a particular speed simply considered to be indicative of jammed traffic. The free-flow speed for a segment, as discussed above, is preferably defined as the average speed of travel across the element represented by the segment during a period of time in which there is no or substantially little traffic. This period may for example be one or more night-time hours where speed over the segment may be less influenced by other users. Such measurements of free-flow speeds will still reflect the influence of speed limits, road layout and traffic management infrastructure for example. This may therefore be a more accurate reflection of the true free-flow speed than posted speed limits, legal speeds or speed assignments based on road category. In other embodiments however the free-flow speed may be calculated or selected differently. It may for example simply be taken to be the speed limit for the segment. In some embodiments the selected percentage of the free-flow speed is between 30% and 70%, more preferably is between 40% and 60%, and most preferably is substantially 50%. In some embodiments a pre-defined upper limit may be used as the jam threshold speed where the method of defining the jam threshold speed would otherwise result in the use of a higher speed. It may be for example that the method of defining the jam threshold speed might in a particular case result in a speed considered too high to be jammed for the particular segment. In that case the jam threshold speed may default to the upper limit. In some embodiments the jam probability for a segment, and preferably for each of a plurality of time periods, is calculated according to the ratio of the number of average speeds of travel across the segment above and below the jam threshold speed. By way of example, as discussed above, a collection of positional (probe) data for a segment might be analysed to provide average speeds for each of the one or more shorter time periods. In this case the number of probes providing an average speed across the segment above and below the jam threshold speed might be compared for a given shorter time period. In one example, the ratio of jammed and not jammed probes might be 70:30, giving a jam probability of 30%.

As discussed above, for each of the one or more segments, and optionally for each of a plurality of time periods, an expected speed of travel for the segment is determined, with the expected speed of travel being a value between the first mean speed of travel and the second mean speed of travel that is calculated based on the congestion parameter. This may be achieved in any desired and suitable way.

In some embodiments, the expected speed of travel for the segment, and optionally time period, is a weighted average of the first mean speed of travel, e.g. the arithmetic mean speed of travel, and the second mean speed of travel, e.g. the harmonic mean speed of travel, with a weighting for the weighted average being based on the congestion parameter. The weighting may be more towards the first, e.g. arithmetic, mean speed of travel when the congestion parameter indicates that congestion is less severe, and may be more towards the second, e.g. harmonic, mean speed of travel when the congestion parameter indicates that congestion is more severe. The expected speed of travel for a segment may therefore be lower or more pessimistic when there is heavier congestion. This addresses, as discussed above, the issue that in congested traffic the expected speed given using, for example, the arithmetic means tends to be too high, thus providing an estimated arrival time for a journey that is too optimistic. The weighting acts to increase the share of the second mean speed, e.g. harmonic mean speed, relative to the first mean speed, e.g. arithmetic mean speed, when determining the expected (or average) speed of travel for the segment based on the traffic state with the share increasing with higher congestion severity. It will be understood that the first mean speed will typically be, and preferably is, always equal or higher than the second mean speed regardless of the particular methods chosen to calculate the first and second mean speeds.

The weighting may be applied using a weighting factor for the segment, and optionally time period, that is based on the relevant congestion parameter. In some embodiments, the weighting factor may take a value within a predetermined range, for example 0 to 1. The weighting factor may be lower, e.g. closer to 0, when the severity of congestion is low (e.g. such that a jam is less likely), and may be higher, e.g. closer to 1, when the severity of congestion is high (e.g. such that a jam is more likely). Although it will be understood that the opposite is also possible.

As discussed above, the data associated with a given segment is preferably for a shorter time period within a longer time period, i.e. a segment has data for a plurality of time periods. The shorter time period may have a length selected from a group of lengths, for example consisting of: 5 minutes, 5-10 minutes, 10-15 minutes, 15-20 minutes, 20-30 minutes, 30-60 minutes, 1-2 hours, etc. The longer time period may be, for example, substantially equal to a day, a week, a month, or a year. It may be for example that the segment data, and so the first mean speed, second mean speed and congestion parameter, e.g. jam probability, for a segment, relate to a particular hour of a particular day of the week. These parameters, when used during that particular hour of that particular day may accordingly produce a reasonable result for that time.

For example, in some embodiments, the first mean speeds, second mean speeds and congestion parameters are associated with particular shorter time periods (e.g. hours or portions thereof) of a day. This may serve to increase the accuracy of those parameters since they may vary depending on time of the day dependent factors such as rush hours, school runs, opening and closing times (e.g. bars, restaurants, theatres, concert venues, cinemas, clubs, etc.), start and finish times (e.g. festivals, shows, sporting events, etc.), arrival and departure times (e.g. trains, ships, aircraft, etc.) and widespread commonality of activity (e.g. eating, sleeping, etc.). In some embodiments there may for example be a single first mean speed, second mean speed and/or congestion parameter, e.g. jam probability, for night. Night may be a predefined period between set times e.g. between substantially 11 pm and 6 am.

In other embodiments the first mean speeds, second mean speeds and congestion parameter values are also, or instead, associated with particular days of the week. This may serve to increase the accuracy of those parameters since they may vary depending on day of the week dependent factors such as weekend shopping, Friday travel for a weekend away, haulage schedules and Monday long-distance commuting. In other embodiments the first mean speeds, second mean speeds and congestion parameter values are also, or instead, associated with particular times of the year. This may serve to increase the accuracy of those parameters since they may vary depending on seasonal influences such as prevailing weather and road surface condition. In some embodiments the first mean speeds, second mean speeds and congestion parameter values are also, or instead, associated with the occurrence of a particular event or situation. Such events or situations may for example include particular types of weather, events such as football matches or exhibitions and public holidays and the like. Thus, in some of the embodiments, the first (e.g. arithmetic) mean speeds, second (e.g. harmonic) mean speeds and congestion parameters are associated with more than one of the factors discussed above.

In the present invention, data indicative of the determined expected speed of travel, and preferably the determined expected speeds of travel for a plurality of time periods, is associated with the segment in the electronic map. In embodiments in which a plurality of speeds of travel are associated with the segment, the data can comprise the plurality of determined speed values themselves. Alternatively, the data can comprise a profile indicating the variation of the expected speed with time, i.e. a speed profile. In other embodiments, and as described in WO 2009/053411 A1, the data can comprise a reference or pointer to one of a set of standard speed profiles. The standard speed profiles may be normalised, e.g. with respect to a free-flow speed for a segment, and in such embodiments the data indicative of the determined expected speeds of travel comprises a reference to a normalised speed profile and the free-flow speed for use in scaling the value obtained from the speed profile. As will be appreciated, such standard speed profiles provide an approximation of the determined speed profile. In this latter embodiment, the method preferably comprises: processing a set of measured speed profiles determined for a plurality of segments using a clustering method to generate a set of standard speed profiles; comparing, for each segment, the measured speed profile and each of the standard speed profiles; selecting the standard speed profile that is most similar to the measured speed profile based on the comparison, such that the selected standard speed profile provides an approximation to the measured speed profile;

and associating the selected standard speed profile with the relevant segment in the electronic map.

The expected speed or speeds of travel generated in accordance with the present invention may be output and/or used in any desired and suitable way. In preferred embodiments, the method may further comprise providing the electronic map and/or the data indicative of the expected speeds of travel that is associated with one or more segments, or the expected speeds of travel derived therefrom, to a computing device, e.g. a remote computing device, such as a navigation device, for use in one or more of: determining a route from an origin to a destination using the electronic map; determining an estimated journey time or estimated time of arrival (ETA) for a route using the electronic map; and identifying the presence of a traffic jam or other congestion event based on a comparison of a determined current speed of travel for the segment to the expected speed of travel. The method may, in embodiments, further comprise using the computing device to perform one of more of the aforementioned operations. For example, the expected speeds of travel may be used by route planning algorithms to plan one or more routes, preferably having an associated journey time or ETA. Thus, in some embodiments the method comprises determining a route across an area covered by the electronic map. This may comprise exploring routes based on the expected speeds of travel and then generating a navigable route.

The method of the present invention may accordingly be implemented in the context of a navigation operation. Thus, the method may be carried out, at least in part, by a system or device having navigation functionality. However, it will be appreciated that the methods may also be carried out by any suitable system or device having route generating capability, but not necessarily navigation functionality. For example, the methods may be implemented by a computer system, e.g. a desktop or laptop system, which does not have navigation functionality. A user may be presented with a generated route which may then be printed or otherwise used to aid route selection at a subsequent time, or, for example, the route may be stored for future use, e.g. downloading to a navigation device.

In some embodiments, the step of determining a route across an area covered by the electronic map is performed on a server. In other embodiments, the expected speeds of travel across segments are sent to a navigation device (from a server) and the determination step is performed on the navigation device. Thus, as discussed above, the method may be carried out, at least in part, using a navigation device. The navigation device may be a PND or an integrated, e.g. in-vehicle, device. The navigation device may comprise a display for displaying an electronic map to a user, a set of one or more processors configured to access digital map data and cause an electronic map to be displayed to a user via the display, and a user interface operable by a user to enable the user to interact with the device.

In preferred embodiments the method further comprises providing information indicative of a generated route to a user. This may involve outputting the route or information indicative thereof to a user. The information may be in any way indicative of the route, e.g. a set of instructions, which may be audible, visual and/or haptic, but preferably is a visual representation of the route. The route is preferably a user selected route and the instructions may be provided in response to a user selection of a route.

In preferred embodiments, the method comprises displaying the route to a user. In preferred embodiments, the step of displaying the route may comprise superposing the route on the electronic map. However other forms of output may be used. For example the method may alternatively or additionally comprise printing information indicative of the at least one route. Thus, the information indicative of the route is preferably output to a user via a navigation device, but in other embodiments the information may be output by any suitable processing device, e.g. by being displayed by a computer apparatus having route generating capability but not necessarily navigation capability, etc. This may be relevant where the route is generated by a server.

It will be appreciated that the methods in accordance with the present invention may be implemented at least partially using software. It will thus be seen that, when viewed from further aspects and in further embodiments, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

In the paragraphs above and below the phrases "average speed" and "mean speed" are used. It will be appreciated, however, that in reality it may never be possible to know such speeds completely accurately. In some cases for example, the speeds calculated can only be as accurate as the equipment used to measure time and position. It will be appreciated therefore that wherever the phrases "average speed" and "mean speed" are used, it should be interpreted as such speeds as calculated based on measurements which may themselves have associated errors.

The present invention in accordance with any of its further aspects or embodiments may include any of the features described in reference to other aspects or embodiments of the invention to the extent it is not mutually inconsistent therewith.

BRIEF DESCRIPTION OF THE DRAWINGS

Embodiments of the invention will now be described, by way of example only, with reference to the accompanying drawings, in which.

DETAILED DESCRIPTION

The present invention is, in preferred embodiments at least, directed to methods of generating expected speeds of travel for segments of an electronic map. Accurate generation of expected speeds of travel is important when route planning and/or when providing additional route information such as journey times or estimated times of arrival (ETAs). The present invention provides a method for more accurately generating expected speeds of travel than in conventional approaches.

Embodiments of the present invention will now be described with particular reference to a processing device, such as a server, that is arranged to access a data store of positional data received from a plurality of mobile devices, such as portable navigation devices (PNDs) that are configured to execute navigation software so as to provide route planning and navigation functionality, and which may be associated within vehicles. The positional data for a mobile device preferably comprises one or more traces; with each trace representing the movement of that device within a 24 hour period. Each 24 hour period is typically arranged to coincide with a calendar day, but in other embodiments this need not be the case. The server also has access to an electronic map, also referred to as map data, comprising a plurality of segments representative of road network on which the mobile devices can move.

Figure 1:
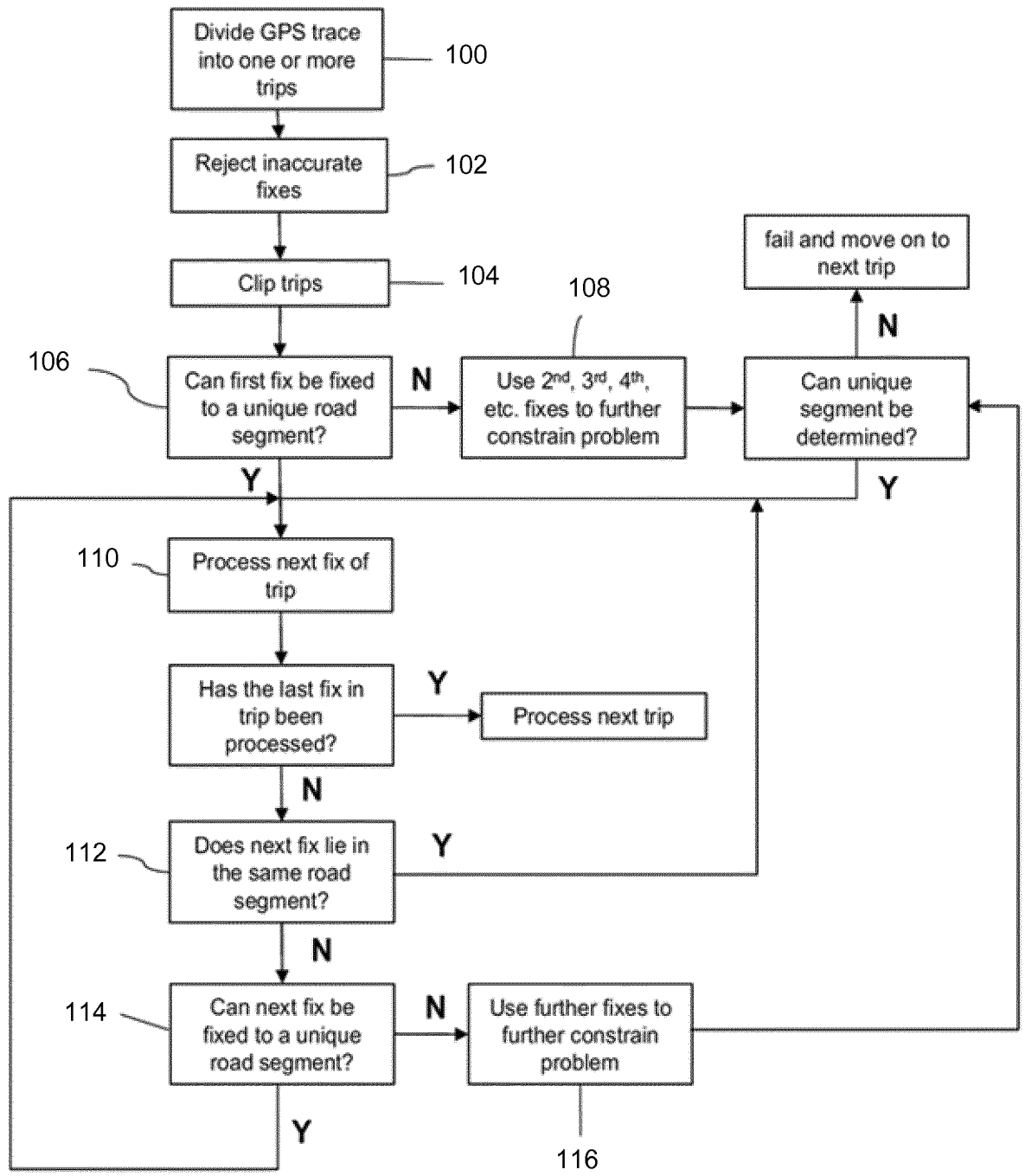
FIG. 1 shows a flowchart outlining an embodiment for matching GPS fixes within a trace to segments of a map.

As a first process, the server is arranged to perform a map matching function between the map data and the GPS fixes contained within the positional data that has been received and such a process is described in relation to FIG. 1. Such map matching may be performed in a so-called real time manner; i.e. as the positional data is received or may be performed a time later after the positional data has been recalled from the data store.

In order to increase the accuracy of the map matching, pre-processing of the positional data is performed as follows. Each GPS trace (i.e. a 24 hour period of GPS data) is divided 100 into one or more trips with each trip representing a single journey of the mobile device which are subsequently stored for later processing.

Within each trip GPS fixes whose accuracy report received from the mobile device is not sufficiently high are rejected 102. Thus, in some embodiments, a fix may be rejected if the accuracy report indicates that the signals from less than four satellites were being received by the mobile device in relation to that GPS fix. Further, each trip is clipped 104 when the reported time between fixes goes above a threshold value. Each trip that passes this pre-processing stage is passed to be map matched.

In this context, a clipped trip is a trip in which the there is a time period between consecutive GPS fixes of greater than a predetermined time. As such, it might be inferred that the vehicle has remained stationary and as such it should be considered a first trip has ended and a second trip has commenced. Thus, a clipped trip becomes two separate trips.

However, before a trip is divided a check is made as to whether the position of the vehicle has changed between the last two fixes since a gap above the predetermined time between GPS fixes may also result from a loss of GPS signal and in such circumstances, the trip is not divided. In the embodiment being described, the predetermined time is roughly 3 minutes. However, the skilled person will appreciate that the gap may be any other suitable time, such as roughly any of the following: 15 seconds, 30 seconds, 1 minute, 90 seconds, 2 minutes, 5 minutes, 10 minutes or any time in between these. As discussed hereinafter, if the average speed of a navigation device 200 from which the GPS fixes are sent is below a predetermined threshold then data, may in some embodiments, be rejected in later processing. Such an embodiment can be useful in that it can remove data relating to so-called stop-start traffic which occurs after incidents such as a crash or the like which may leave remaining data more representative of steady state traffic flow.

Then, each trip is taken in turn and fixes within that trip are matched to a map from within the map data. Each map comprises a plurality of road segments along which it is possible to travel with each segment being represented within the map as a straight vector.

The program code running on a processor of the server provides a map matcher that is arranged to step over the or each fix in the trip that is being processed until it finds a fix which lies within a segment or is sufficiently close to a segment in order for it to be assumed to have occurred on that segment (i.e. it is within a distance threshold of the segment). This threshold allows for less than 100% GPS accuracy and the compressing effect of splitting the road into a set of straight vectors. Each trip has an initial fix (i.e. the first fix within the trip) which is harder to associate with a segment than other fixes within the trip since there are no segments that have already identified which can be used to constrain the selection of the segments. If, for this first fix, multiple segments are within the threshold 106, then the algorithm looks to the next GPS fix (i.e. the 2nd fix) within the trip and generates a set of roots from those multiple segments based on the possible travel as a function of the distance between the 2 fixes (i.e. between the 1st and 2nd fixes). If the 2nd fix does not lead to a unique candidate segment for the 1st fix, then the algorithm moves to the 3rd fix within the trip and again generates and compares the possible routes to try and provide a unique candidate for the first fix 108. This process may continue until the remaining GPS fixes within a trip have been processed.

An advantage of such an embodiment is that although any one first fix in isolation may be near multiple segments, and in isolation these segments can't be distinguished between, it becomes possible using the further travel (i.e. the 2nd and 3rd fixes) to determine the identity of the segment with which the first fix is associated. Thus, a first segment for a trip is determined by the map matcher.

Once the first segment has been identified for a trip, further fixes are processed in order to identify further segments. It is of course possible that the next fix of the trip lies within the same segment as the first fix 112.

Thus, the subsequent fixes of a trip are processed 110 to determine if they are within the distance threshold of the segment, and the map matcher is arranged to associate that segment with each of the fixes that lie within the distance threshold. When the map matcher process a fix that is out with the distance threshold it is arranged to generate a new set of candidate segments for that fix. However, it is now possible to add a further constraint that the next segment is one which is connected to the end of the one which has just been processed. These neighbouring segments are obtained by the map matcher from the underlying map data. If at any point the map matcher fails to identify a segment for a given fix that follows on from the previous segment, either because there are no segments within a threshold, or it cannot uniquely identify a single segment, then the map matcher is arranged to step through subsequent fixes 116 in order to further constrain the journey until it can identify a segment that is a unique match. That is, if the nth fix cannot be uniquely associated with a segment the nth+1 segment is used to further constrain the identification of a segment. If the nth+1 fix does not produce a unique segment then the nth+2 fix is used. In some embodiments, this process may carry on until the a unique segment is identified or all of the GPS fixes with a trip have been processed.

The map matcher is arranged to try and uniquely identify segments; in the embodiment being described, it does not attempt to create a continuous route, only to try and match segments to fixes. In other embodiments, it may be desirable to try and have the map matcher generate continuous routes.

Therefore, at the end of the process that the map matcher is arranged to perform, a series of road segments are obtained along which the mobile device has travelled in the trip being analysed. Subsequently, the map matcher further processes these road segments and assigns, from the GPS fixes, an ingress time and also a transit time for that segment. These assigned times are stored within the data store for later processing. It may well be that a plurality of GPS fixes are stored for each road segment. However, regardless of whether how many GPS fixes are associated with each segment, the ingress time, GPS fixes and the length of the segment (which in this embodiment is stored within the map data) are used to calculate the average speed for that segment of road. This average speed is then stored within the data store associated with the relevant assigned times and that segment. Information relating to a speed of traffic flow on a road segment and assigned to a road segment may be thought of as being speed data for that road segment.

The server is further arranged to run averaging program code on the processor to provide an averaging means which processes the assigned times to generate one or more averages therefrom as described below. The averaging process used in this embodiment is now described in relation to FIG. 2.

In a first step of the process 200, the averaging means groups the average speeds for each road segment on the map being processed. Within the grouping for each road segment, the averaging means is further arranged to group the average speeds within a set of predetermined time periods 102. Thus, average speeds which occur within the same time period (e.g. between 8.00 am and 8.59 am) are grouped together for further analysis. In the embodiment being described, the time periods are one hour durations but this need not be the case and the skilled person will appreciate, from the following description, that as the length of the time period decreases the resolution of the data is increased but storage requirements are increased. Other suitable time periods might substantially any of the following: 1 minute, 5 minutes, 10 minutes, 15 minutes, 30 minutes, 2 hours, 6 hours, 12 hours, or any time in between these times.

In the embodiment being described, average speeds are stored in a time local to the area covered by the map being processed rather than a centralised time. Such a method is convenient as it provides a natural basis for traffic related issues.

Before an average speed generated from a trip is grouped into a predetermined time period it is screened to try and increase data quality. In this embodiment, the average speed is only added to the group for the predetermined period if the average speed falls within a predetermined range. In this embodiment, the method excludes speeds which exceed a maximum predetermined threshold (which may be roughly 180 km/h) and further, the method excludes speeds which fall below a predetermined amount of the average speed for that segment in that predetermined time period (which may for example be 2 km/h). The skilled person will appreciate that speeds which are well below the average speed for that segment in that time may well be associated with a problem in the traffic flow for that segment, such as a traffic jam or the like. Thus, including data relating to such conditions may reduce the overall accuracy of the data when considering the road in normal conditions. In other embodiments, the maximum permitted speed may be set as the speed limit for that segment of road, but the skilled person will appreciate that such information can be inaccurate in map data that is being processed and also that the speed limit for a segment of road may in fact not give an accurate indication of traffic conditions.

Once grouping into the predetermined time periods has been performed an average speed is calculated for each road segment for each predetermined time period—see step 204. For example, all of the speeds within the 8.00 am to 8.59 am time period, for each segment of road are averaged.

Figure 3:
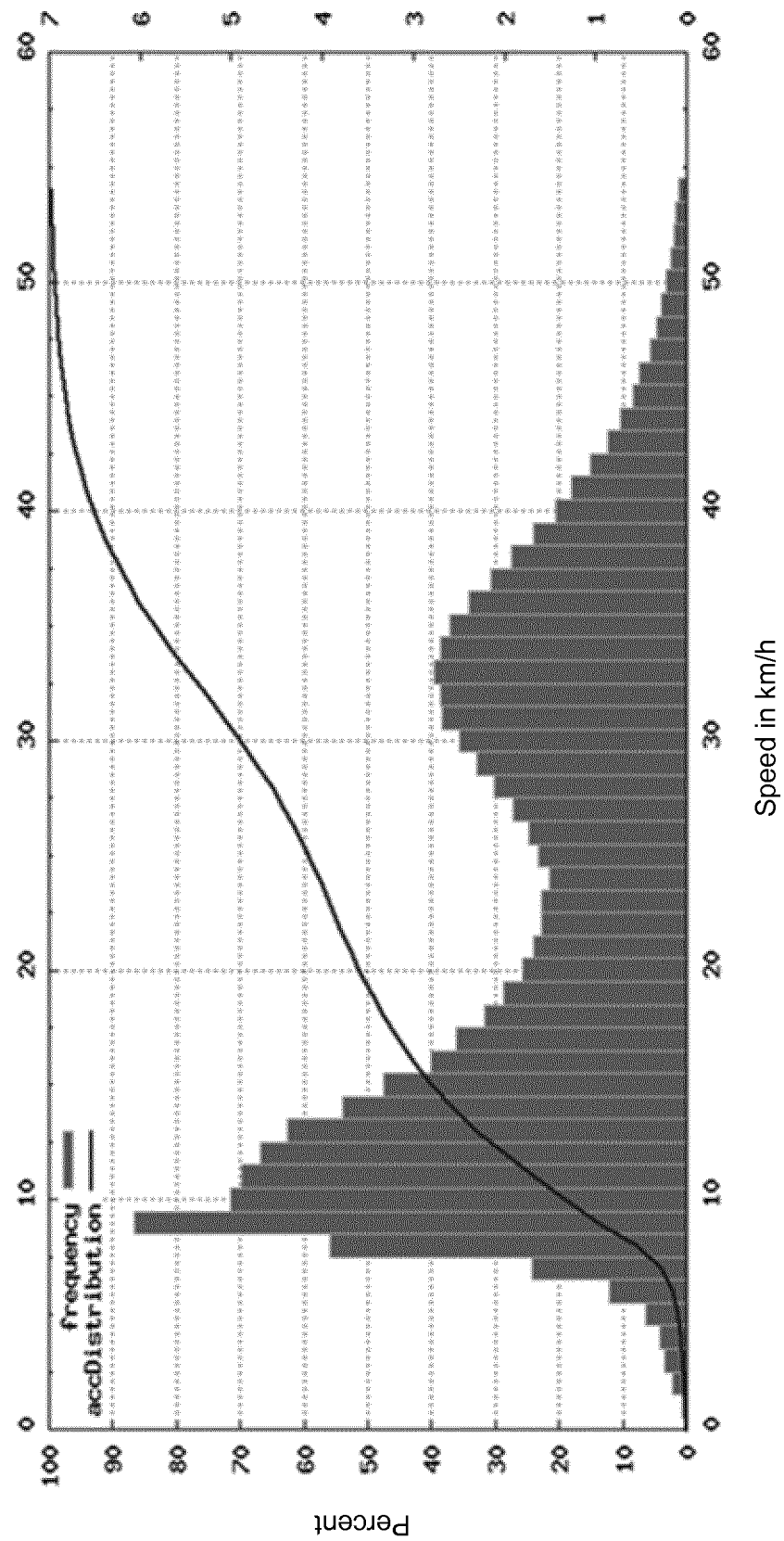
FIG. 3 is a histogram showing the distribution of speeds within a time period for a segment.
Figure 4:
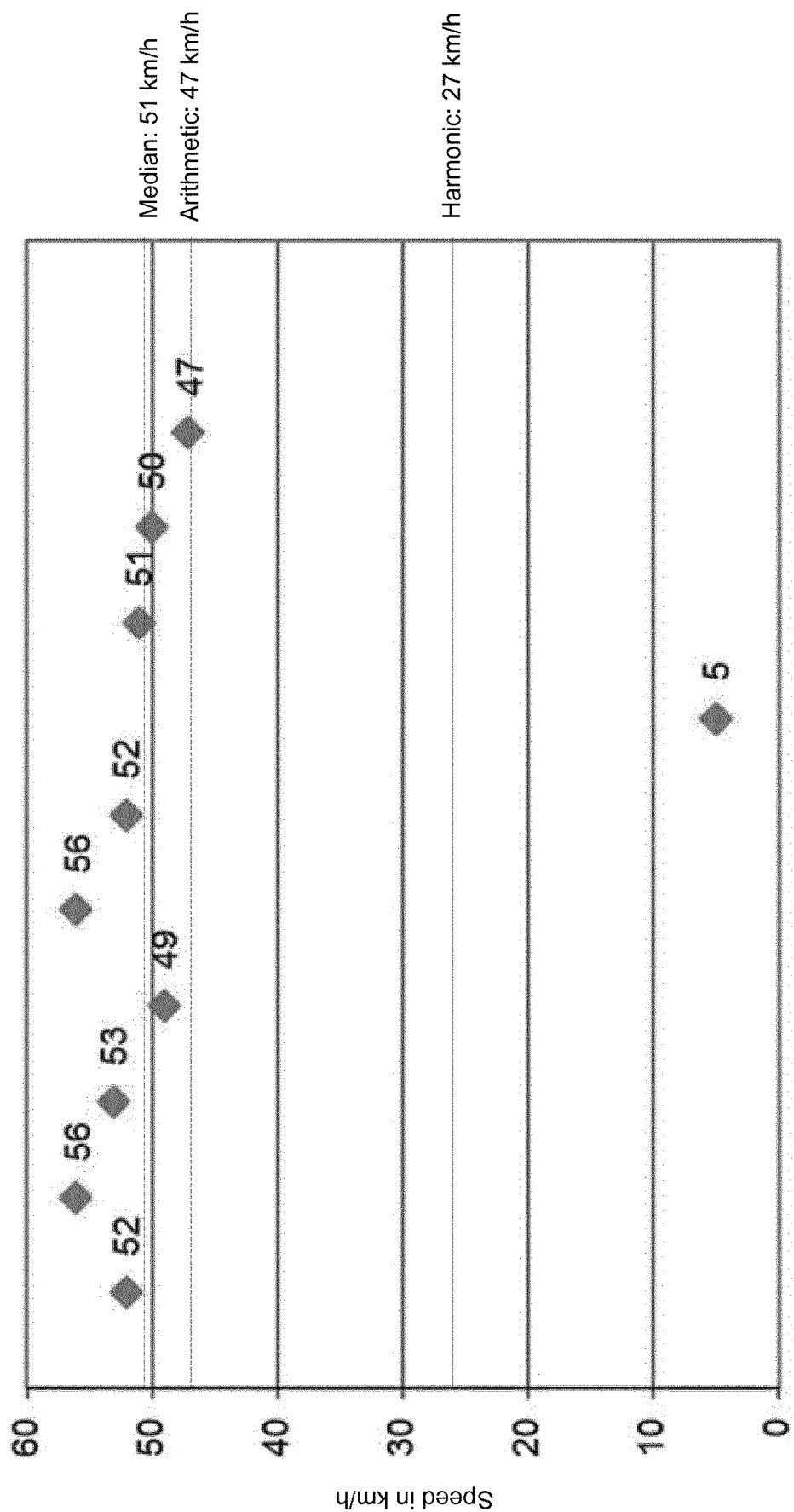
FIG. 4 is a plot of average speeds of travel together with an arithmetic mean of those speeds and a harmonic mean of those speeds.

FIG. 3 shows a histogram of average speeds of travel across a segment for a 15 minute time period on a particular day, with the frequency count being shown on the right-hand axis. A plot (the line overlying the histogram) of the cumulative probability is also provided, with the cumulative probability being shown as a percentage on the left-hand axis. The histogram may be considered to represent historic data in the sense that the data recorded is not live data, but reflects data collected for the same time period over repeating occurrences of the day. For example, the data could relate to the time period of 9.00 am to 9.15 am on a Monday for the past 2 months. The data is not therefore a direct result of raw data collection occurring substantially at the current time, recording actual events on the road segment within for example the last fifteen minutes. The data may however be used to predict what may be occurring on the segment at the present time in view of patterns occurring in traffic levels and behaviour. As can be seen, vehicles have traversed the segment at each speed from 1 km/h to 54 km/h. There are several possible options for computing the average speed: using plain arithmetic or harmonic means or computing the median. It has been identified, however, and as discussed in more detail below, e.g. with reference to FIG. 4, that a speed which is between a harmonic mean speed and an arithmetic mean speed, and which is also based on the typical traffic situation, i.e. the severity of congestion, on the segment during the relevant time period, can provide an improved representation of the expected speed of travel for a segment.

The arithmetic mean speed $V_a$ is calculated for a time period from the average speeds for that time period using the following equation:

$$V_a = \frac{1}{n}\sum_{i=1}^{n} v_i$$

wherein:

$v_i$ is the $i^{th}$ average speed for the segment and time period; and n is the number of average speeds for the segment and time period.

The harmonic mean speed $V_h$ is calculated for a time period from the average speeds for that time period using the following equation:

$$V_h = n\left(\sum_{i=1}^{n} \frac{1}{v_i}\right)^{-1}$$

wherein:

$v_i$ is the $i^{th}$ average speed for the segment and time period; and n is the number of average speeds for the segment and time period.

Conventionally, the average speed for a segment is determined as the arithmetic mean, due to the harmonic mean being more sensitive to the presence of a limited number of severe outliers. This is shown, for example, by FIG. 4, which shows a plot of ten average speeds of travel across a segment for a time period: nine of the speeds are in the range between 47 km/h and 56 km/h, while there is one outlier at 5 km/h. As shown on the plot, the arithmetic mean speed is 47 km/h (to 2 sf), while the harmonic mean speed (due to the influence of the outlier) is 27 km/h (to 2 sf).

It has been found, however, that the arithmetic mean speed tends to overestimate the expected speed during periods of high congestion (rush hour), i.e. the expected speed is too optimistic. To overcome this problem, it has been recognised that a more accurate expected (or average) speed for a segment during a particular time period can be determined as a weighted average, e.g. as a convex combination, between the harmonic mean speed (the lower bound) and the arithmetic mean speed (the upper bound), wherein the weighting is based on a congestion parameter indicative of the expected severity of congestion on the navigable element represented by the segment during the time period. More specifically, the expected speed is weighted toward the arithmetic mean speed during periods that historically have low congestion, and weighted toward the harmonic mean speed during periods that historically have high congestion.

The congestion parameter is determined using the above described average speeds grouped for each time period, such that a congestion parameter is determined from historic data for each time period. The congestion parameter is determined using a free-flow speed for the road segment, and is based on the proportion of vehicles with the group having an average speed slower than the free-flow speed and the relative difference, for each vehicle, between the measured average speed and the free-flow speed. The congestion parameter is determined, such that the impact of a measured speed on the congestion parameter increases as the measured speed becomes slower. Thus a vehicle traversing the road segment at a speed slightly slower than the free-flow speed will have less of an impact on the congestion parameter than a vehicle traversing the road segment at a speed that is substantially less than the free-flow speed. The free-flow speed for a road segment is the average speed of travel across the segment during a period when the influence of other vehicles is negligible, e.g. a low traffic period, such as the night time or early morning hours. The congestion parameter is thus a measure reflecting the typical traffic situation on the element represented by the respective segment.

In less preferred embodiments, the congestion parameter can be based on jam probabilities as determined using the method described in WO 2014/001549 A1; the entire content of which is incorporated herein by reference. In view of the way in which such jam probabilities are defined, i.e. as the number of measured average speeds below a defined jam threshold speed relative to all the measured average speeds, it has been found that if most of the vehicles traverse a road at a speed slightly higher than the jam threshold speed, but still less than the free-flow speed, then the jam probability is close to zero. However, in such situations, it has been found that it can be preferable to already move the toward the harmonic average.

Figure 2:
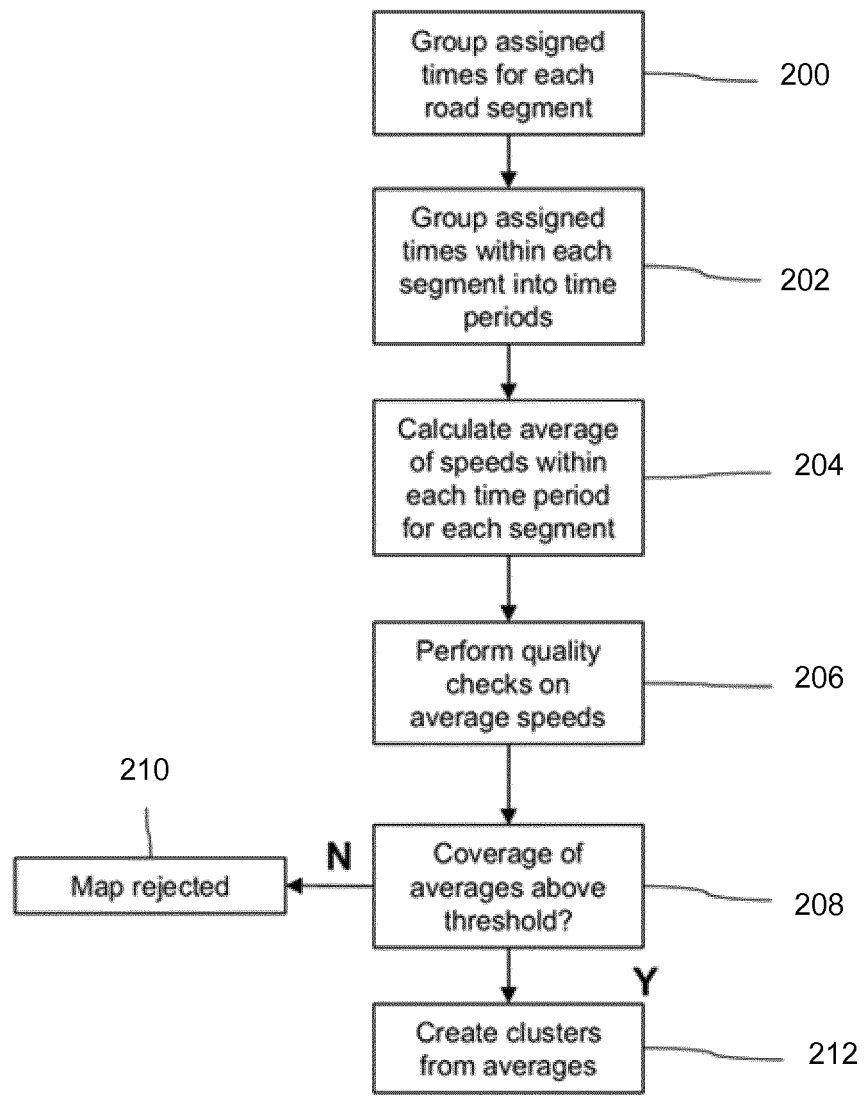
FIG. 2 shows a flowchart outlining an embodiment for generating "average" speeds for a plurality of time periods for a plurality of segments.
Figure 5:
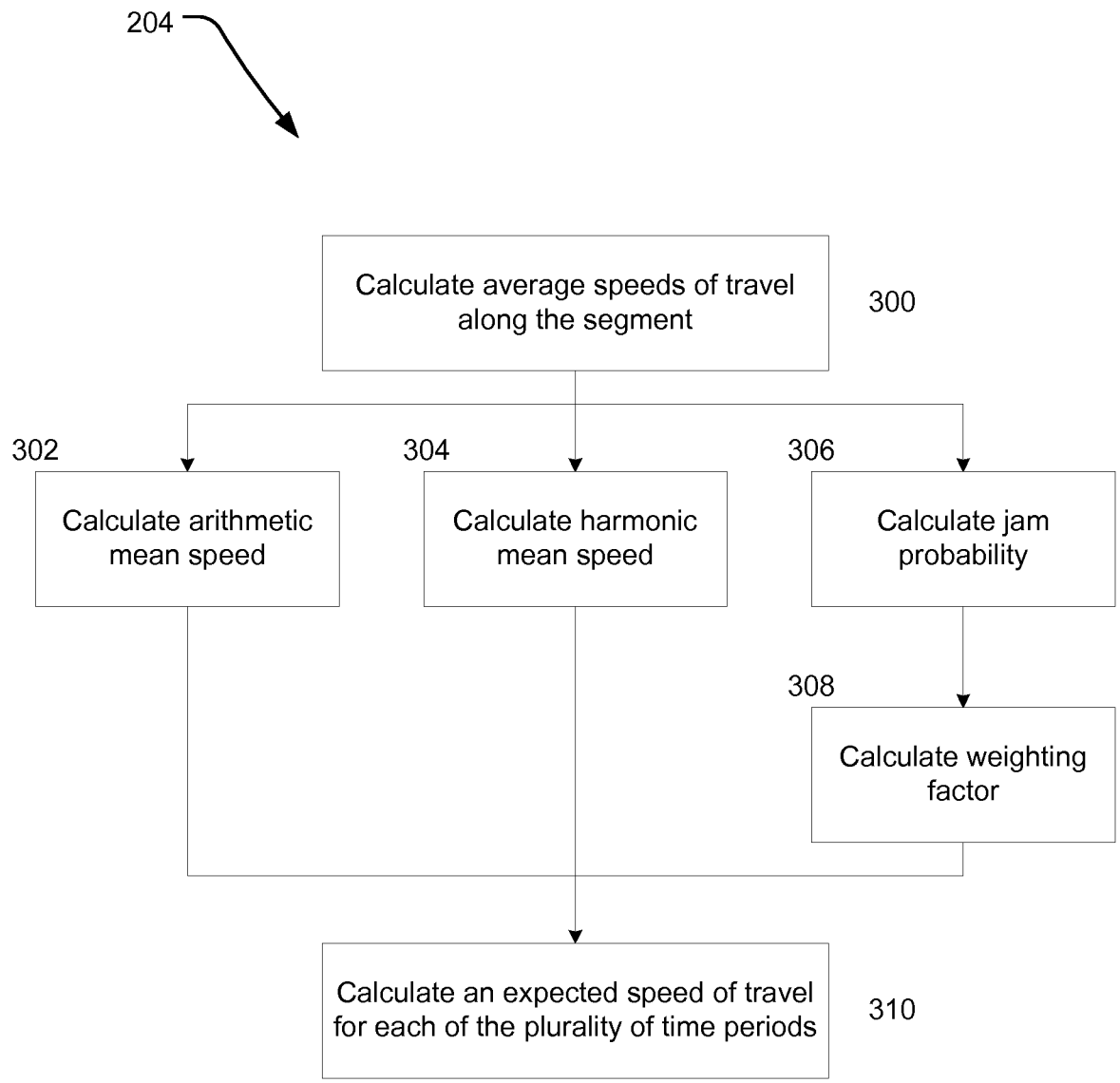
FIG. 5 is a flowchart outlining an embodiment showing the details for determining an "average" speed for a time period for a segment.

A method illustrating the method performed in step 204 of the process of FIG. 2 is shown in FIG. 5. This method will typically be performed by a server. In a first step of the process 300, the calculated average speeds for traversing road segments grouped by time period (as determined from positional data) are accessed from a database. For each time period of each road segment, the arithmetic mean speed $V_a$ is determined (step 302) and the harmonic mean speed $V_h$ is determined (step 304). Then, at step 306, a congestion parameter is calculated for each time period of each road segment. This may involve calculating a free-flow speed for each road segment, e.g. by determining an arithmetic mean speed using the calculated average speeds for time periods at night or in the early morning. In this example, the higher the congestion parameter value the more severe the expected level of congestion on the road represented by the segment. Next, at step 308, a weighting factor is calculated from the congestion parameter for each time period for each segment. The weighting factor is typically determined based on an exponential function so as to take a value between 0 and 1, such that: the weighting factor is almost 0 for low congestion severity; and the weighting factor is almost 1 for high congestion severity. In an example, the weighting factor $w(x): [0,\infty[ \to [0,1]$ is calculated using the following equation:

$$w(x) = 1 - \frac{1}{e^{f(x)+1}}$$

where:
$f(x)$ is a function of the congestion parameter x given by:

$$f(x)=A(x-B)$$

where:
x is congestion parameter;
A is a tuning factor (defining the slope or steepness of the function); and
B is an offset value (defining the value of x such that $w(x)=0.5$ holds.

Referring again to FIG. 5, at step 310 an expected speed of travel $V_e$ is then calculated in respect of each of the shorter time periods using the arithmetic mean speed, harmonic mean speed and weighting factor, using the following equation:

$$V_e=(1-w(x))V_a+w(x)V_h$$

Other weighting functions may of course be used such that the expected speed of travel is suitably between the harmonic mean speed and the arithmetic mean speed based on the jam probability for the time period and segment in question.

Then, at step 414, the expected speed of travel for the shorter time is associated with the segment.

The above steps may of course be carried out in respect of each one of the plural shorter time periods within the longer time period and in respect of each one of the segments of the electronic map. The expected speeds of travel for the segments of the electronic map may then be stored and/or output for use.

Referring to again to FIG. 2, for the map being processed there is generated for each segment of road on the map 24 average speeds; an average speed for each hour long pre-determined time period. The average speed being the expected speed of travel $V_e$ given above. It will be appreciated that if a different duration of time period is used then there will be a different number of average speeds. It will be further appreciated that, in fact, not all road segments will necessarily have an average speed assigned thereto for every time period since some roads may be traversed infrequently, particularly at unsociable times such as the early hours of the morning.

However, before the average speeds per segment are used quality checks are performed in step 206. In this embodiment, this check ensures that more than a predetermined number of assigned times were used to generate average speed per segment. If this is not the case then that average speed per segment is rejected for further processing leaving a gap for that segment at one or more time periods. In some embodiments, the average is rejected if there are fewer than 5 values that went to make up that average. Other embodiments, may of course use different values, such as 2, 3, 4, 6, 7, 8, 10, 20 or more or any value in between these. Also, a further check on the quality of the average is performed and for each average the standard deviation of the average is divided by the square root of the number of data samples that went to make up the average for that segment for that time period. If the result of this calculation is outside a predetermined threshold then that average is again rejected leaving a gap for that segment for that time period.

Further quality checks may be implemented to reject averages on any of the following: whether the deviation in the data is beyond a predetermined threshold; the existence of more than a predetermined number of outliers beyond a predetermined threshold. The skilled person will appreciate such statistical techniques to ensure the quality of the data.

The set of averages for any given road segment may be thought of as a measured speed profile for that road segment.

The skilled person will appreciate that if a measured speed profile for a road segment has few missing speed values (i.e. all or at least the majority of the predetermined time periods have a value) then that segment may be processed and the missing values are therefore masked. As the number of missing segments increases then the quality of the resulting cluster analysis is reduced. Thus, just how many missing time periods are allowed is a matter of a quality decision and has to be examined from case to case. Using only high-quality, complete data may apply too much weight to road segments with high coverage (i.e. few missing time periods) which normally comprises highways, motorways and other roads along which many people travel. Too low a requirement (i.e. clustering road segments that have too many missing time periods) leads to unrealistic clusters and inaccurate analysis.

Figure 6:
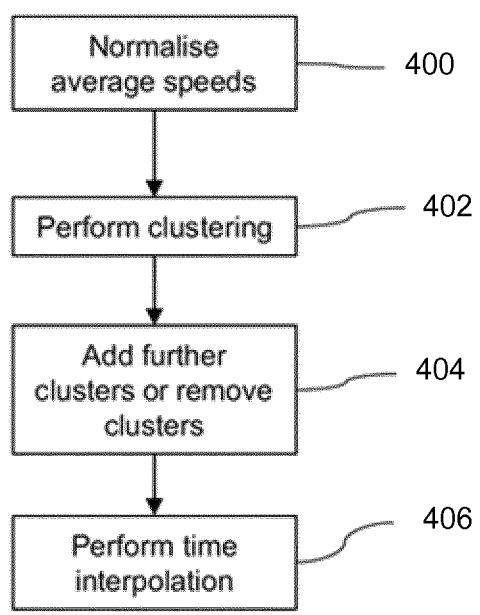
FIG. 6 shows a flowchart outlining an embodiment for performing cluster formation on a plurality of determined average speeds.

Each average that passes these quality checks is considered trustworthy and is approved for use in further processing. In step 208 an assessment is made as to the overall coverage of average speeds per road segment. If the coverage of trustworthy averages is high enough then the map data is forwarded for further processing. However, if the coverage is below a predetermined threshold then the map is rejected from further consideration 210. Acceptable maps are passed for cluster formation in accordance with step 212 of FIG. 2, and as is described further in relation to FIG. 6.

Such cluster formation aims to extract regular speed profiles in an automatic or semi-automatic manner; as will be discussed later, data compression, which may be significant, can be achieved if it is assumed that roads of a similar class may have a similar speed profile. For example, the speed at 10 am on a Sunday morning for a first segment of road may be similar to the speed at the same time for a second segment of road. If this similarity for those segments of road is repeated for other times then the speed profile for the first and second segments may be considered to be represented by the same speed profile of the second segment. The clustering as now defined aims to locate such similarities. Normalisation of speed profiles, as discussed below, may also allow a speed profile to be used for roads of a different class.

Before the clustering is performed, the measured speed profile is further processed in order to amalgamate the night-time time periods. In this embodiment, the average speeds between 9 pm and 5 am (i.e. 8 time periods) are averaged and this night-time average is used for each of 8 time periods; that is the measured speed profile is modified to replace a portion thereof with modified values for the average speeds for one or more predetermined time periods which comprises using an average of the speed averages to be replaced as the modified value for each of the predetermined time periods. Thus, each speed profile has a flat speed profile between the hours of 9 pm and 8 am which may be termed the free flow speed of that road segment. It may be assumed that the free flow speed represents the speed at which a vehicle, generally a car, travels along the road and it is often the case that the free flow speed is different from the speed limit for that road segment. The free flow speed may also be roughly the same as the speed limit for that road segment. In a first step 400 and in order to limit the number of clusters the measured speed profiles are normalised between predetermined parameters. Such normalisation can be performed according to a number of criteria. In the embodiment being described, normalisation occurs according to the free flow speed that has been calculated for the segment of road with which the average is associated. As such, the average speed per road segment that is passed to the clustering algorithm has a value of between 0 and 1. Thus, in this embodiment, the predetermined parameters are 0 and 1. The skilled person will appreciate that other parameters are possible. Such a method can aid further data compression since it can make the resulting cluster-generated speed profile independent of the type of road and as such it becomes possible to use the same set of speed profiles for road segments having any road type. The cluster generated speed profiles may also be thought of as generated speed profiles.

Use of the free-flow speeds during the night time period may reduce the dimension of the cluster formation since it may be possible to neglect night time speed values. In yet further embodiments, the average speed or the speed limit of a road segment may be used as a further criteria against which to perform the normalisation.

Thus, days showing a similar traffic behaviour can be grouped together by processing by a clustering algorithm. If the expected traffic behaviour is different the cluster formation should run independently. An input parameter to the clustering algorithm is the number of desired clusters and a typical range is 10-70 for a day of the week. There are known methods to approach the optimal number of clusters (e.g. having some quality measures assigned and enlarging/reducing the numbers of clusters according to its trend) which may be used to determine whether the output of the clustering is acceptable.

In one embodiment, the clustering algorithm is run and arranged to generate around 60 clusters (step 402). In other embodiments, the algorithm may be arranged to generate more or less clusters initially. The resultant clusters are then processed to determine whether the generated clusters are satisfactory: are some of the clusters too similar (i.e. substantially the same)? Do any of the clusters have discontinuities therein? If there are problems with any of the clusters then the algorithm is re-run with the process aiming to generate fewer clusters than the first iteration. This iterative process is repeated until a satisfactory set of clusters is determined.

In some embodiments, whether the clusters are satisfactory includes a step of determining whether or not any of the cluster-generated profiles contain frequencies above a predetermined threshold. The presence of such frequencies indicates that that cluster-generated speed profile has a rate of change that is too high (i.e. there may be a discontinuity) and if used may result in instability, etc. within a navigation device using that data to generate a route.

Whether or not the clusters are satisfactory may also include the step of performing a comparison between at least some, and generally each, of the cluster-generated speed profiles. In one particular embodiment this may be performed by a least squares comparison.

In one embodiment the cluster is performed by cluster analysis, but other class building methods might be used as well. A simple and efficient approach is the so-called k-means clustering algorithm. This non-hierarchical method normally starts with k random seeds and redistributes the class members according to a minimum error criteria based on a chosen metric. The algorithm leads to local minima only, therefore for an optimal solution it has to run multiple times. The run with the minimum error estimates gives what may be a preferred solution. The centroids of the final clusters form the predefined clusters. In other embodiments other clustering techniques may be used and these include hierarchical clustering and fuzzy clustering.

Some embodiments, may add further clusters 404. For example, some embodiments may add a flat line as a speed profile for road segments that have no trustworthy trend, e.g. due to low data coverage or because of traffic related issues.

As a final step 406 in the preparation of the cluster generated speed profiles, the clusters are interpolated to a variable time resolution. In one embodiment this is performed using cubic splines but other techniques are possible such as an exponential fitting function. The skilled person will also appreciate similar techniques that may be used.

Even if the time resolution used in the cluster analysis procedure itself is coarser than is finally desired, which may occur in order that there are a sufficient number of reliable average speed in any one predetermined time period, the time resolution can now be modified. For example, it can be modified to finer resolution to meet the requirements of the intended use. For example, it can be advantageous to have a finer resolution having a more continuous profile in place is desired to provide smoother routes which might otherwise "jump" on time boundaries if the time resolution is too coarse. In the embodiment being described, the cluster-generated profiles are interpolated in order that they have a resolution of roughly 5 min intervals, although any other period may be used. Such a period may be convenient for later processing using the cluster-generated speed profile.

Figure 7:
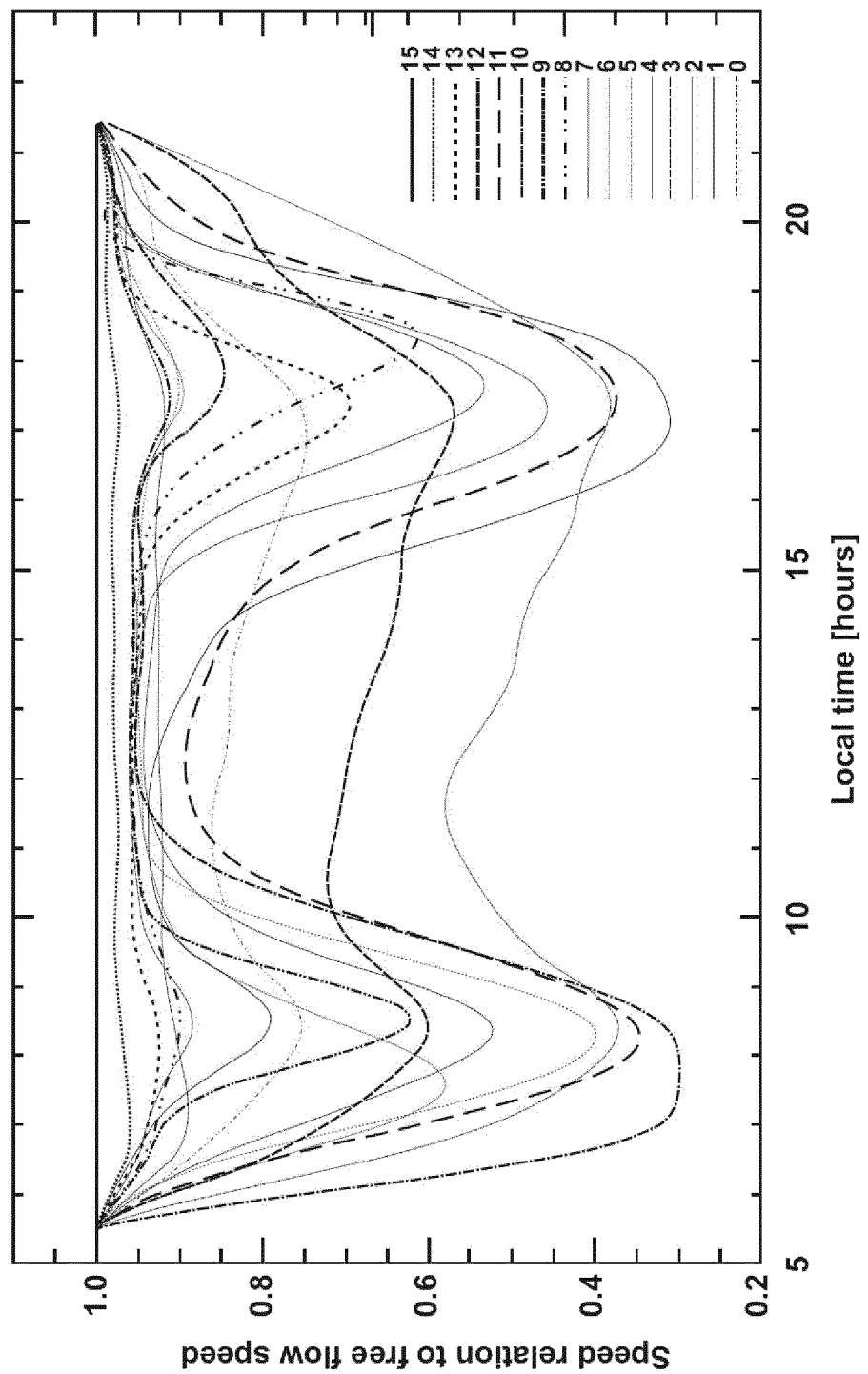
FIG. 7 shows an example set of cluster generated speed profiles which are output from the clustering algorithm.

FIG. 7 shows a typical output from the clustering algorithm for a map in which the input average speed values have been clustered into 16 independent cluster generated speed profiles. Thus, for that map each section of road can now be referred to as having one of the 16 cluster generated speed profiles. If in other embodiments, the number of clusters is varied then the number of possible speed profiles for any one segment of road is also changed.

Once, a suitable set of cluster generated speed profiles has been determined—in this embodiment 16 have been generated—then these are associated with one or more maps. Generally, a set of speed profiles will be more accurate for the map from which they have been generated since traffic behaviour may be different on roads not on that map. For example, should a map cover a single country then it may be that traffic in a different country follows slightly different patterns.

However, in other embodiments, the speed profiles may be associated with a plurality of maps. In one example, this may be appropriate if the a map covers a portion of a country and/or it may be appropriate to use the map for a plurality of countries.

Figure 8:
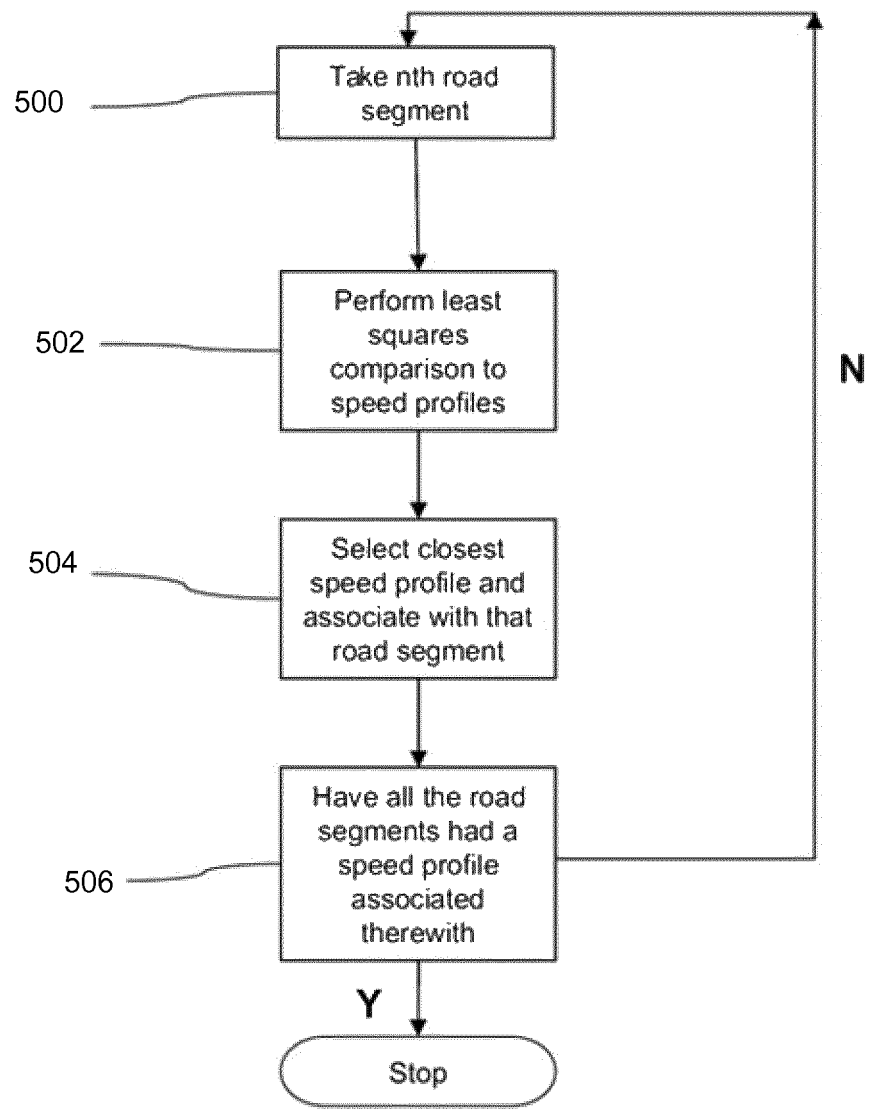
FIG. 8 shows a flowchart outlining how the cluster generated speed profiles are associated with segments of a map.

Each road segment that is present on the map being processed is analysed and may have one of the cluster generated speed profiles (as shown in FIG. 7) associated therewith and this process is described in relation to FIG. 8. Starting with n=1, the nth road segment is processed 500.

Reference is made herein to speed data being associated with a road segment. The skilled person will appreciate that each road segment is represented by data within the map data providing the map. In some embodiments, such data representing the road segment may include an identifier which provides a reference to the speed data. For example the reference may provide a reference to a generated speed profile.

It will be appreciated that in order for devices using the map to accurately generate routes, it is desirable that each road segment has a speed profile associated therewith in which there is a high degree of belief (as a first step this is assessed on whether the measured speed profile is suitable). Thus, if the quality assessment made earlier has determined that the measured speed profile does not meet the quality criteria then a fall back strategy is used to replace the measured speed profile with speed data which is likely to prove better for routing purposed when processed by a navigation device or other device. This fall back strategy is described in more detail in WO 2009/053411 A1; the entire content of which is incorporated herein by reference.

Next, the speed profile (whether a measured speed profile or an average inserted by gap filling) associated with a road segment is now mapped to one of the cluster generated speed profiles to generate the map data which can be used by navigation devices. This may be performed regardless of whether the speed information is a measured speed profile or an average in view of the presence of the flat cluster generated speed profile number 15.

In step 502 the speed profile is compared, using a least squares comparison, with each of the speed profiles in the set of cluster generated speed profiles. After these 16 comparisons have been made it is possible to determine which speed profile from the set of 16 is closest to the speed profile associated with the road segment and in step 504 a reference to the cluster generated speed profile that is deemed to be closest is stored in the map data for that road segment. Also stored in the map data in relation to that road segment is the free flow speed for that road segment which has been calculated earlier.

Thus, using the reference and the free flow speed, information can be stored within the map data which provides information on the average speeds for each road segment. For frequently travelled segments the average speed information provided may be thought of as comprising an approximation to the daily hourly average between the hours of 9 am to 5 pm. For less travelled segments the average speed data may be thought of as being an average speed which is averaged across all time periods.

This is repeated 506 until each of the road segments on the map has had one of the set of 16 cluster generated speed profiles associated therewith.

Figure 9:
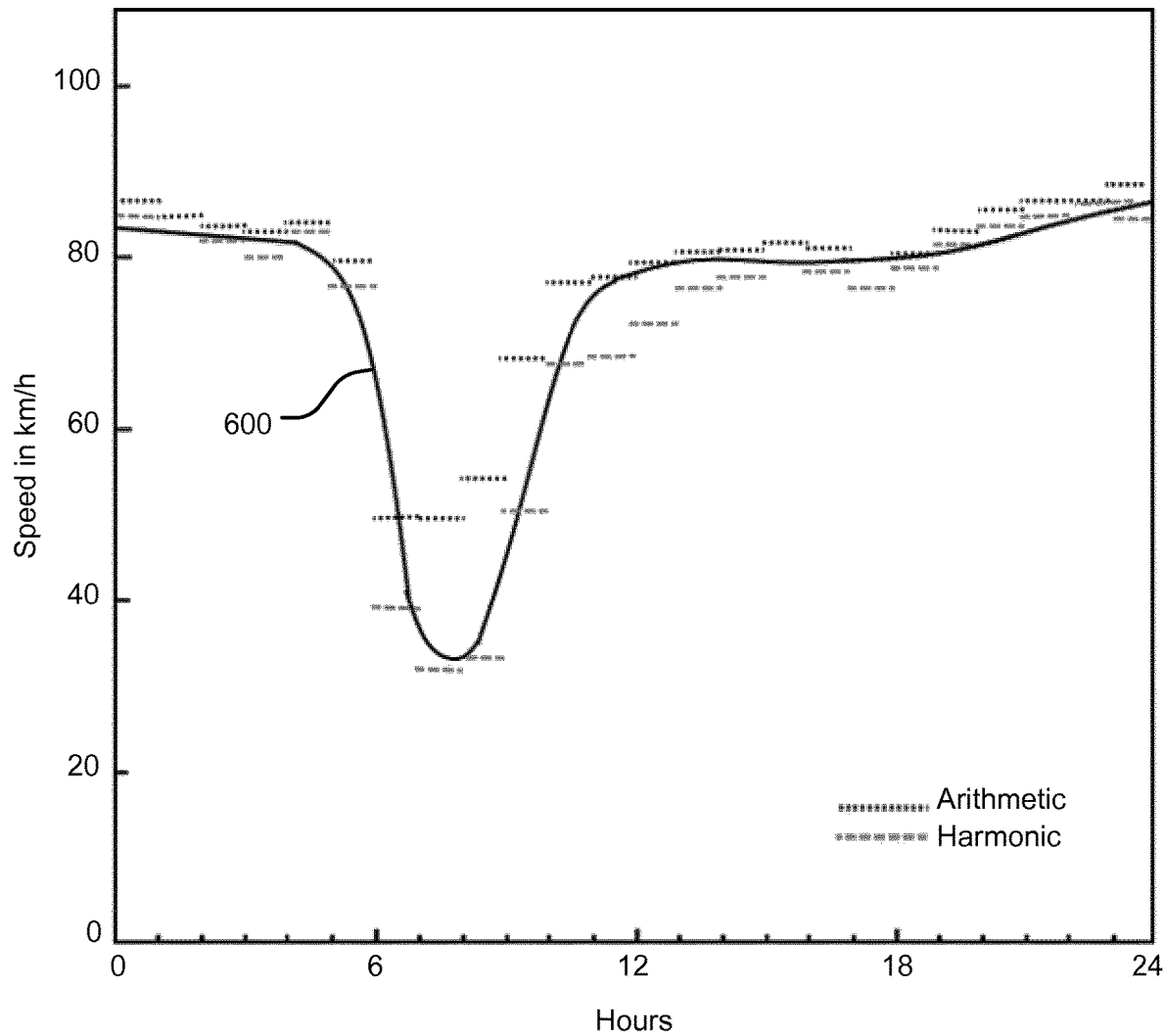
FIG. 9 is a plot showing the arithmetic and harmonic mean speeds of travel along a segment for each hour of the day, together with the associated cluster generated speed profile for the segment.

FIG. 9 shows an example of a speed profile 600 associated with a segment following the process shown in FIG. 2. Also shown on the plot are the calculated values of the arithmetic mean and the harmonic mean for each time period.

It can be seen from the above that the present invention, in preferred embodiments at least, provides a method for more accurately generating expected speeds of travel than in conventional approaches.

The skilled person will appreciated that an apparatus provided to execute a method as described herein may comprise hardware, software, firmware or any combination of two or more of these.

The skilled person will appreciate that, whilst the term GPS data has been used to refer to positioning data derived from a GPS global positioning system. Other positioning data could be processed in a manner similar to the methods as described herein. Thus, term GPS data may be replaceable with the phrase positioning data. Such positioning data, could for example be derived from position data derived from mobile phone operation, data received at toll barriers, data obtained from induction loops embedded in roads, data obtained from number plate recognition system or any other suitable data.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method for generating an expected speed of travel along one or more navigable elements of a navigable network within a geographic area, each navigable element being represented by a segment of an electronic map, the electronic map comprising a plurality of segments representative of the navigable network, wherein each of the segments is associated with a congestion parameter indicating the severity of congestion on the navigable element represented by the respective segment, said method comprising:
obtaining positional data relating to the movement of a plurality of devices along a navigable element represented by a segment of the electronic map;
determining, using the positional data, a first mean speed of travel and a second mean speed of travel for the segment;
determining an expected speed of travel for the segment by computing the expected speed of travel as a result of a function of the first mean speed of travel, the second mean speed of travel, and the congestion parameter for the segment, wherein the expected speed of travel is a value between the first mean speed of travel and the second mean speed of travel; and
associating data indicative of the determined expected speed of travel with the segment in the electronic map.

2. The method of claim 1, comprising determining, using the positional data, the congestion parameter for the segment.

3. The method of claim 2, wherein each of the segments of the electronic map is associated with a free-flow speed, and wherein the congestion parameter for the segment is determined using the free-flow speed for the segment.

4. The method of claim 3, wherein the congestion parameter is a measure based on: the proportion of devices within a set having a measured speed less than the free-flow speed; and the relative difference, for each device within the set, between the measured speed and the free-flow speed.

5. The method of claim 1, wherein the first mean speed of travel is the arithmetic mean and the second mean speed of travel is the harmonic mean, such that the first mean speed of travel is always equal to or greater than the second mean speed of travel.

6. The method of claim 1, wherein the expected speed of travel is determined based on the congestion parameter such that the expected speed of travel is closer to the first mean speed of travel when the congestion parameter indicates that congestion is less severe and closer to the second mean speed of travel when the congestion parameter indicates that congestion is more severe.

7. The method of claim 1, wherein the expected speed of travel is computed as a weighted average of the first mean speed of travel and the second mean speed of travel, with a weighting for the weighted average being based on the congestion parameter.

8. The method of claim 7, wherein the weighting is applied using a weighting factor, said method further comprising determining the weighting factor using an exponential function having the congestion parameter as a variable.

9. The method of claim 1, comprising determining a plurality of expected speeds of travel for the segment for each of a plurality of predetermined recurring time periods, the plurality of expected speeds of travel forming a measured speed profile for the segment.

10. The method of claim 9, comprising:
processing a set of measured speed profiles determined for a plurality of segments using a clustering method to generate a set of standard speed profiles;
comparing, for each segment, the measured speed profile and each of the standard speed profiles;
selecting the standard speed profile that is most similar to the measured speed profile based on the comparison, such that the selected standard speed profile provides an approximation to the measured speed profile; and
associating the selected standard speed profile with the relevant segment in the electronic map.

11. The method of claim 1, comprising providing the data indicative of the determined expected speed of travel for one or more segments of the electronic map to a computing device for use in at least one of: generating a route through the navigable network from an origin to a destination using the electronic map; and determining an estimated journey time to travel a route generated through the navigable network from an origin to a destination using the electronic map.

12. A system for generating an expected speed of travel along one or more navigable elements of a navigable network within a geographic area, each navigable element being represented by a segment of an electronic map, the electronic map comprising a plurality of segments representative of the navigable network, wherein each of the segments is associated with a congestion parameter indicating the severity of congestion on the navigable element represented by the respective segment, said system comprising one or more processors arranged to:
- obtain positional data relating to the movement of a plurality of devices along a navigable element represented by a segment of the electronic map; means for determining, using the positional data, a first mean speed of travel and a second mean speed of travel for the segment;
- determine an expected speed of travel for the segment by computing the expected speed of travel as a result of a function of the first mean speed of travel, the second mean speed of travel, and the congestion parameter for the segment, wherein the expected speed of travel is a value between the first mean speed of travel and the second mean speed of travel; and
- associate data indicative of the determined expected speed of travel with the segment in the electronic map.

13. A non-transitory computer readable medium comprising instructions which, when read by a computing device, cause the computing device to operate according to the method of claim 1.

* * * * *